US009734451B2

(12) United States Patent
Srinivasan et al.

(10) Patent No.: US 9,734,451 B2
(45) Date of Patent: Aug. 15, 2017

(54) AUTOMATIC MODERATION OF ONLINE CONTENT

(71) Applicant: Adobe Systems Incorporated, San Jose, CA (US)

(72) Inventors: Balaji Vasan Srinivasan, Bangalore (IN); Anandhavelu N, Tamil Nadu (IN); Kannan Iyer, San Ramon, CA (US); Shankar Srinivasan, San Ramon, CA (US)

(73) Assignee: Adobe Systems Incorporated, San Jose, CA (US)

( * ) Notice: Subject to any disclaimer, the term of this patent is extended or adjusted under 35 U.S.C. 154(b) by 261 days.

(21) Appl. No.: 14/267,305

(22) Filed: May 1, 2014

(65) Prior Publication Data

US 2015/0317562 A1 Nov. 5, 2015

(51) Int. Cl.
*G06N 5/04* (2006.01)
*G06N 99/00* (2010.01)

(52) U.S. Cl.
CPC ............ *G06N 5/04* (2013.01); *G06N 99/005* (2013.01)

(58) Field of Classification Search
None
See application file for complete search history.

(56) References Cited

U.S. PATENT DOCUMENTS

| | | | | |
|---|---|---|---|---|
| 2010/0257117 | A1* | 10/2010 | Shvadron | G06F 17/30616 705/36 R |
| 2012/0180138 | A1* | 7/2012 | Zaltzman | G06Q 10/00 726/26 |
| 2012/0290399 | A1* | 11/2012 | England | G06Q 30/0282 705/14.66 |
| 2013/0138735 | A1* | 5/2013 | Kanter | G06Q 50/01 709/204 |
| 2014/0181196 | A1* | 6/2014 | Sullivan | H04L 67/22 709/204 |
| 2015/0088897 | A1* | 3/2015 | Sherman | G06Q 10/00 707/740 |

\* cited by examiner

*Primary Examiner* — Alan Chen
(74) *Attorney, Agent, or Firm* — Finch & Maloney PLLC

(57) ABSTRACT

Techniques are disclosed for automatically modeling and predicting moderator actions for online content. A model can be generated or updated based on the content received and the action or actions taken by the moderator in response to receiving the content. The model can be used to automatically predict which action, or combination of actions, are likely to be taken by the moderator when new content is received, and suggest those action(s) to the moderator. These suggestions can, among other things, simplify and speed up the decision-making process for the moderator.

17 Claims, 5 Drawing Sheets

AUTOMATIC MODERATION OF ONLINE CONTENT

FIELD OF THE DISCLOSURE

This disclosure relates to the field of data processing, and more particularly, to techniques for automatically modeling and predicting moderator actions for online content.

BACKGROUND

Social networking websites allow individuals to interact with other people online. Additionally, these websites provide channels for companies to directly communicate with consumers. For instance, social networking can be used for marketing and customer service. Companies that utilize social networking often designate specific individuals, called moderators, to monitor incoming messages from consumers. For example, a moderator may have responsibility for reading each incoming message and deciding whether the message should be deleted, forwarded to someone within the company, shared with other consumers, or whether some other appropriate action should be taken. However, due to the popularity of social networking, it is becoming increasingly difficult for human moderators to process the sheer volume of information in a timely manner.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
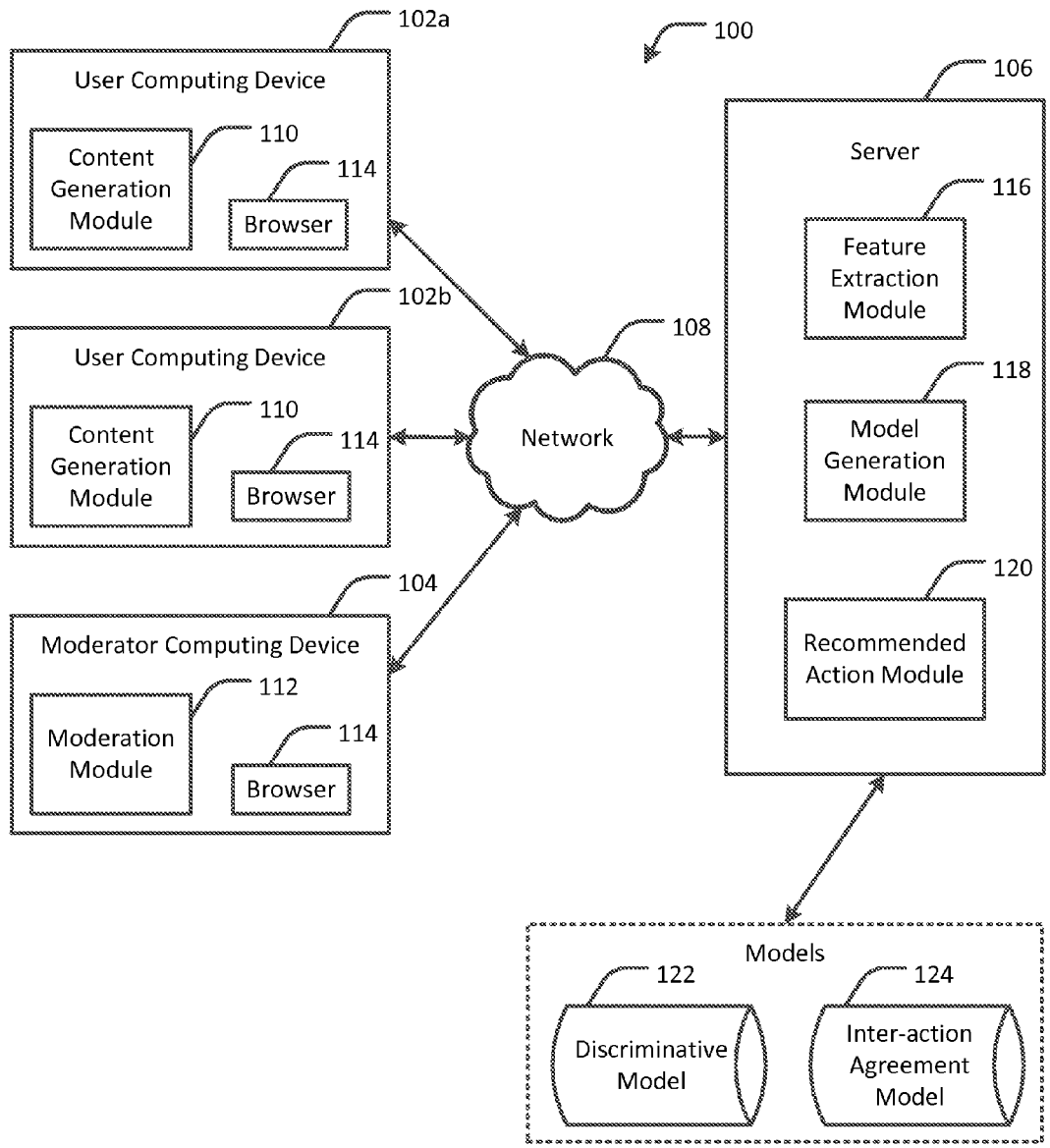
FIG. 1 illustrates an example client-server system for automatically modeling and predicting moderator actions for online content, in accordance with an embodiment of the present invention.

Moderators of social media channels may have several roles. For example, the moderator of a marketing channel may be responsible for maintaining the brand image among customers and running promotions. Brand management can include increasing the visibility of positive words written about the company, as well as deleting or responding to negative comments that may tarnish the brand image as soon as they appear in a social media channel. This requires the marketer to constantly moderate the content of the social media channel by taking certain actions in further disposition of the content. These actions may, for example, include marking posts that favorably promote the brand image, products or services, responding directly to questions posted by consumers, routing sales inquiries to a sales team, and routing technical questions to technical support personnel. However, as noted above, the tasks of the moderator are becoming increasingly difficult to complete given the large volume of content that is added to the social media channel over a relatively short period of time (e.g., dozens of posts per hour).

To this end, and in accordance with an embodiment of the present invention, techniques are disclosed for automatically modeling and predicting moderator actions for online content. A model can be generated or updated based on the content received and the action or actions taken by the moderator in response to receiving the content. The model can be used to automatically predict which action, or combination of actions, are likely to be taken by the moderator when new content is received, and suggest those action(s) to the moderator. These suggestions can, among other things, simplify and speed up the decision-making process for the moderator. Numerous configurations and variations will be apparent in light of this disclosure.

The term "content," as used herein, generally refers to any type of information that a user can interact with electronically, including, for example, text, images, audio, video, and graphics. Content may be included in documents, data, applications, services, web pages, e-mail messages, and electronic files. Examples of such content include messages that are posted to a social networking website, messages that are sent from one user computing device to another via an instant messaging or e-mail service, and photographs that are displayed on a blog. Content can, in some cases, include metadata (i.e., data about data) that may not be directly accessible by a user, such as message routing information, timestamps, authentication credentials, browser cookies, etc. Other examples will be apparent in light of the present disclosure.

The term "moderator," as used herein, generally refers to a user who is tasked with monitoring content published or otherwise submitted by various users and facilitating further disposition of such content by, for example, performing certain actions on the content that other users may not have the privilege to perform. The content may be submitted directly to the moderator, or to a digital online forum or set of such forums within a given jurisdiction that the moderator is tasked with monitoring. For example, a moderator may have the privilege or otherwise be specifically tasked to evaluate content generated or otherwise published by others, delete such content, modify such content, forward or repost such content, respond to such content, or take other suitable actions in response to such content. In some cases, the moderator may have the privilege to take an action with respect to the user-generated content that may not be available to users who are not moderators. For instance, with certain social media websites, users who are not moderators may not have the privilege to modify, delete, or share some other user's posts, while a moderator can have such privileges.

In an example embodiment, a dependence of an action or a combination of actions taken by a moderator in response to receiving electronic content can be modeled using, for example, a machine learning technique, such as one having a support vector machine classifier. In particular, the relationships between each action taken by the moderator upon the content and certain features extracted from the content can be classified in a binary fashion (i.e., either the action has been taken with respect to a certain feature or not). Accordingly, the model can be used to predict, for a given action, the likelihood that the action will be taken by the moderator in response to receiving new content having a certain modeled feature.

In some cases, the electronic content can include one or more types of features, including content-based, user-based, and time-based features. Content-based features may include, for example, textual features (e.g., the frequency with which a particular word or phrase appears in the content), topical features (e.g., the nature of topics discussed in the content or the proportions of various topics to one another), sentiment features (e.g., sentiment or emotion expressed in the content), entities mentioned in the content, intent of the content (e.g., a complaint, purchase, etc.), age of the content with respect to a social channel (e.g., Twitter® content may become less relevant and timely more quickly than blog content), or any combination of these features or other suitable features. User-based features may include, for example, the author of the content, the number of users following or otherwise reading the author's content (e.g., the reach of the content, representing the number or type of people accessing the content), the percentage of positive content about a brand from the author, the frequency of author activities (e.g., number of posts to the website per day or week), the demographics of the author (e.g., geolocation, sex, race, etc.), the author's social score, or any combination of these features or other suitable features. Time-related features may include, for example, the time at which the content was posted to the website, the day on which the content was posted, the similarity of the content by one author to the content of other authors, the similarity of the type of content (e.g., a tweet in response to another tweet posted at a particular time and day, versus a tweet to a blog post posted at a particular time and day) or any combination of these features or other suitable features.

In one example embodiment, a discriminative model can be generated or updated for predicting the likelihood that a particular action will be taken by a moderator in response to receiving content having one or more features. Independent models can be generated or updated for different actions. For example, if the moderator's actions generally include sharing content with a group of other users on a social networking platform (e.g., Facebook® share, Twitter® retweet, etc.), forwarding content to one or more individuals (e.g., via email or text messaging), making content as a favorite, and marking content as spam, independent models can be generated or updated for predicting the likelihood of each of these actions being taken. A discriminative model can also be generated or updated for predicting the likelihood of a moderator taking action on the author of the content, such as marking the author as a spammer, following the author's future content posts, or sending a direct message to the author. In some cases, a Support Vector Machine-based classifier or other suitable classification scheme can be used to generate or update the discriminative model. In some cases, where multiple actions are taken by the moderator in response to receiving new content, the dependency of one action can be modeled on a prior or contemporaneous action taken on the same content features. For example, a moderator may share the content and mark the content as a favorite (in either order or simultaneously). A graphical model can be used to assign probabilities for each edge, where an edge is defined between two moderator actions indicating their likelihood of happening together. In some cases, the discriminative models can be used to predict the likelihood of a particular moderator taking an action. For example, moderator Joe is likely to "like" a particular piece of content, while moderator Mary is likely to share the content and moderator Jane is likely to escalate the content to another user's attention.

Example System

FIG. 1 illustrates an example client-server system 100 for automatically modeling and predicting moderator actions for online content, in accordance with an embodiment. The system 100 includes one or more user computing devices 102a, 102b, a moderator computing device 104, and a server 106, each electronically interconnected via a network 108 (e.g., a wide area network, such as the Internet, or a local area network). Generally, the computing devices 102a, 102b, 104, 106 can be any type of device, such as a PC, tablet, or smart phone, configured to access and provide content (e.g., a web page, a word processing document, a fixed layout document, etc.) provisioned by the server 106 or another content-providing server. It will be understood that the functions of the computing devices variously described in this disclosure can be performed on and by any number of computing devices, depending on the particular application of the system. For instance, one or more of the computing devices can include a content generation module 110, a moderation module 112, a feature extraction module 116, a model generation module 118, and a recommended action module 120. The user computing devices 102a, 102b and the moderator computing device 104 can each include a browser 114 or other application suitable for retrieving, processing, displaying and interacting with the content. Data representing one or more models, including a discriminative model 122 and an inter-action agreement model 124, can be stored in one or more databases or other storage devices accessible by, e.g., the server 106.

Figure 2:
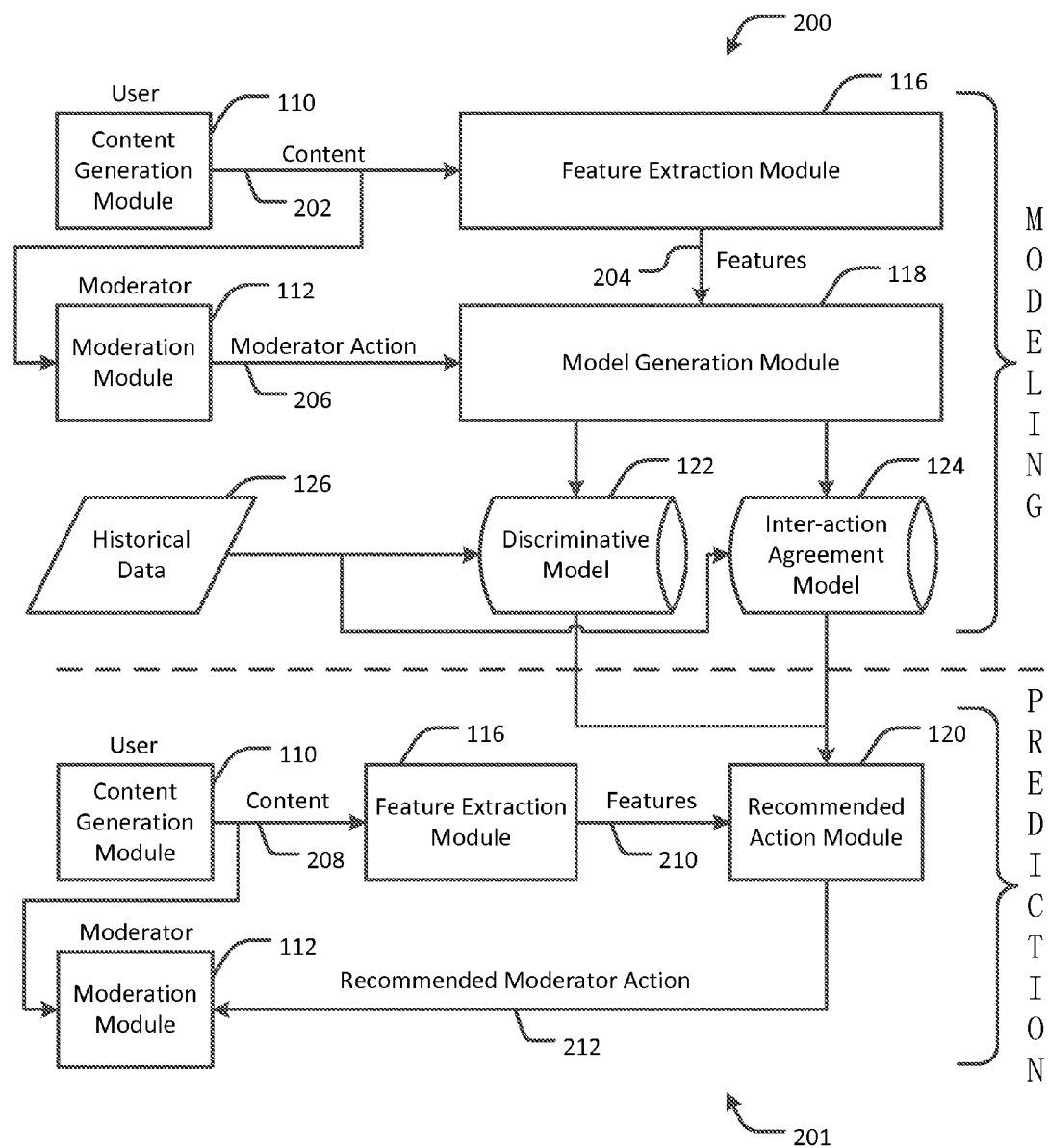
FIG. 2 is a data flow diagram representative of an example methodology for automatically modeling and predicting moderator actions for online content, in accordance with an embodiment.

FIG. 2 is a data flow diagram representative of an example methodology for automatically modeling (200) and predicting (201) moderator actions for online content, in accordance with an embodiment. In use, the system 100 of FIG. 1 can be configured to continuously learn from the activities performed on it, and automatically suggest actions to a moderator based on those activities. For instance, as depicted in FIG. 2, a user can use the content generation module 110 (e.g., via the browser 114) to generate content 202 that is provided to the feature extraction module 116. The feature extraction module 116 analyzes the user-generated content 202 and creates representations 204 of various features in the content. The features 204 can include content-, user- and time-based features, alone or in combination with each other or other types of features. A moderator can use the moderation module 112 to read the content 202 (e.g., via the browser 114) and take an action 206 on it (e.g., re-post, forward, escalate, mark as favorite, mark as spam, delete, etc.). The model generation module 118 uses the feature representations 204 created by the feature extraction module 116 and the actions 206 generated by the moderator to generate or update one or more models. Two non-limiting examples of such models are the discriminative model 122 and the inter-action agreement model 124.

Figure 3A:
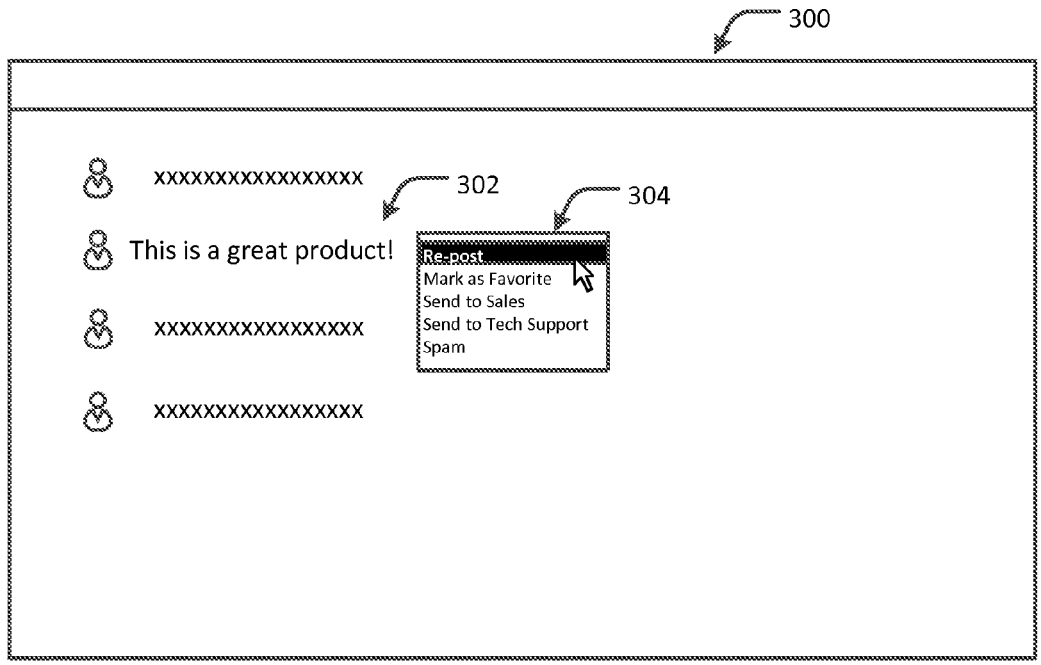
FIGS. 3a and 3b depict example graphical user interfaces for a webpage, in accordance with various embodiments.

In one embodiment, the discriminative model 122 can be used to classify the relationships between certain features 204 and moderator actions 206 (e.g., a dependence of the action on the extracted feature) using existing machine learning techniques. For example, as depicted in an example web page graphical user interface 300 of FIG. 3a, the feature 204 may be a content-based recommendation feature, such as "This is a great product!" (indicated at 302). In response to receiving the content, the moderator may take the action 206 of re-posting the content (indicated at 304) corresponding to the feature 204. Accordingly, the action 206 of re-posting may be classified in the discriminative model 122 as likely or probable with respect to this feature 204 or a similar content-based product recommendation feature.

The inter-action agreement model 124 can be used to associate the relationships (e.g., dependencies) between multiple moderator actions 206 taken on the content 202, and probabilities can be assigned to each association. For example, if the moderator has taken the actions 206 of re-posting the content and marking the content as a favorite, the action of marking the content as a favorite can be associated with the action of re-posting for the same feature 204. The probability of any given association can be determined based, for example, on the frequency at which the moderator performs the associated actions on any content 202. In some embodiments, historical data 126 representing one or more prior moderator actions taken on previously received content can be used to build or update the discriminative model 122, the inter-action agreement model 124, or both.

Figure 3B:
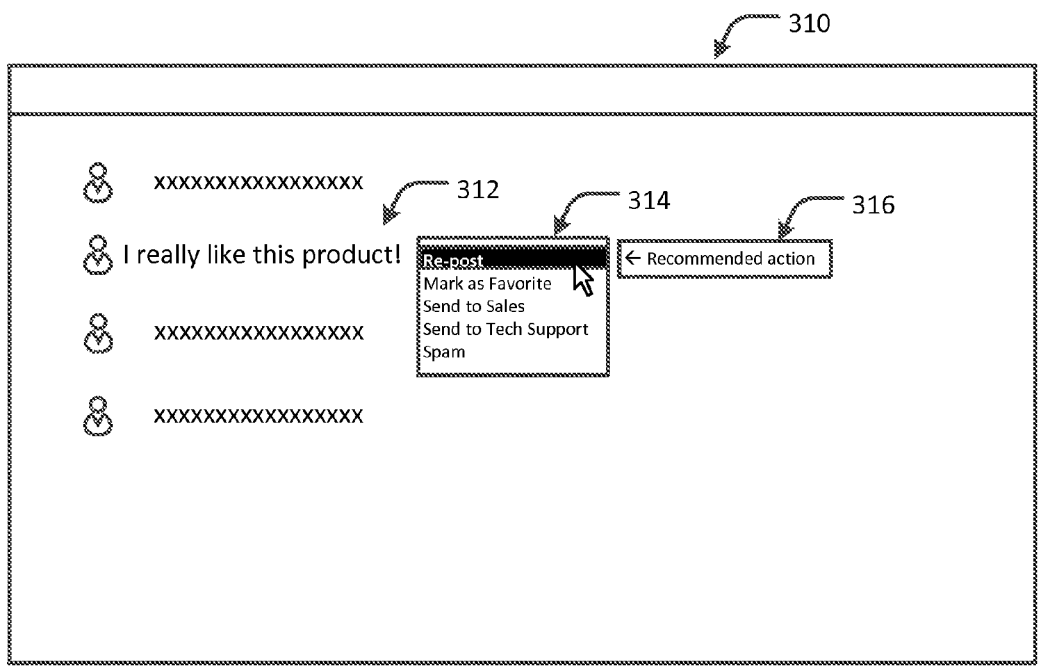

The models 122, 124 can in turn be used to predict which action or actions the moderator is likely to take on new content 208 generated by the same user or a different user based on prior actions 206 taken by the moderator. For example, as depicted in the example web page graphical user interface 310 of FIG. 3b, a user can use the content generation module 110 to generate the new content 208 "I really like this product!" (indicated at 312), which is provided to the feature extraction module 116. The feature extraction module 116 generates feature representations 210 from an analysis of the new content 208 (e.g., the feature may be a content-based recommendation feature). The recommended action module 120 uses the feature representations 210 and the models 122, 124 to generate a recommended moderator action 212. The recommended moderator action 212 can be provided to the moderator via the moderation module 112 as, for example, a suggested action for the moderator to take on the new content 208 (e.g., via the browser 114). One non-limiting example is the graphical icon "Recommended action" depicted in FIG. 3b (indicated at 316) next to a list of available actions (indicated at 314).

Example Methodologies

Figure 4:
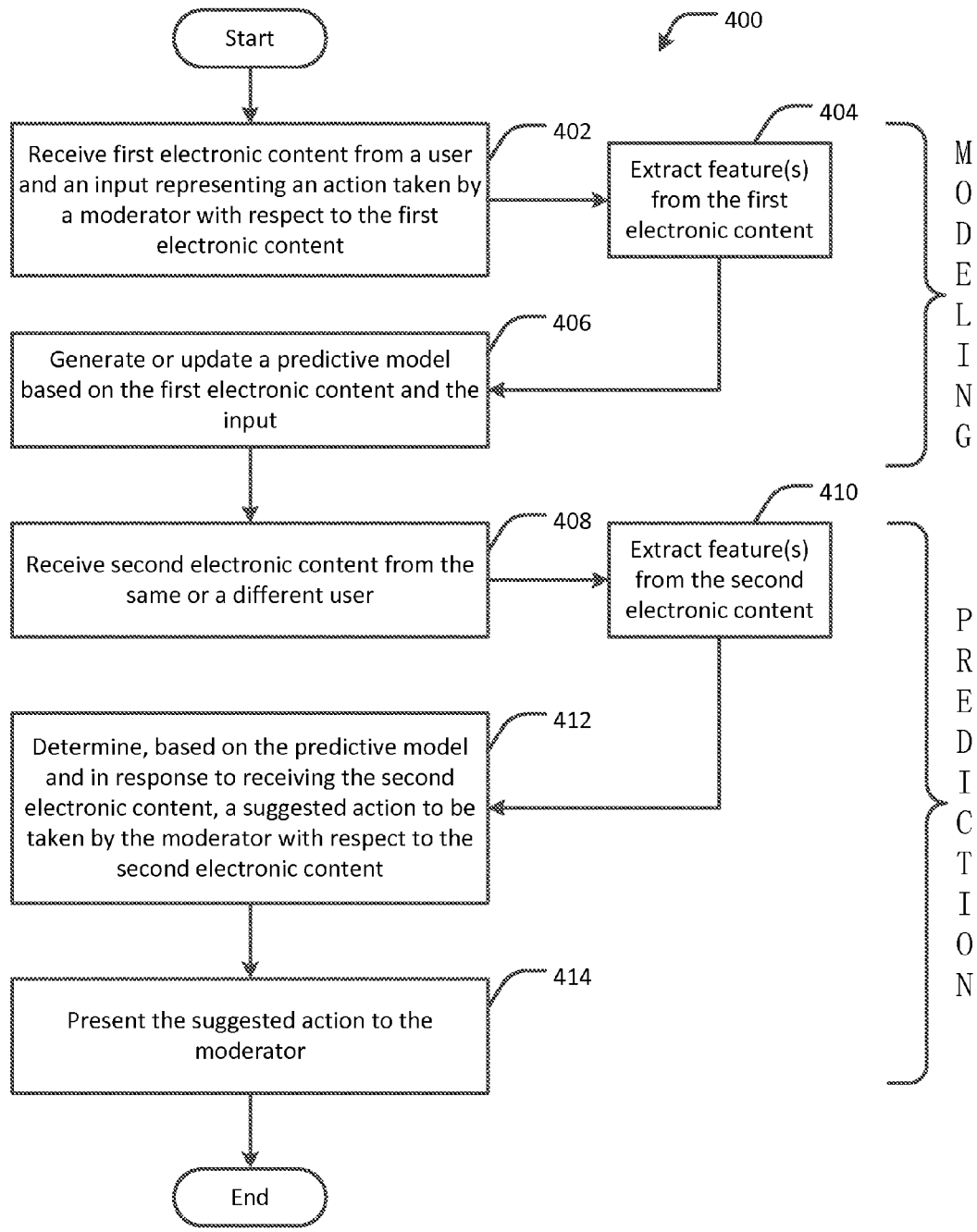
FIG. 4 is a flow diagram of an example methodology for automatically modeling and predicting moderator actions for online content, in accordance with an embodiment.

FIG. 4 is a flow diagram of an example methodology 400 for automatically modeling and predicting moderator actions for online content, in accordance with an embodiment. The example methodology 400 may, for example, be implemented by the server of FIG. 1, and may include a modeling phase and a prediction phase. In the modeling phase, the method 400 begins by receiving (402) first electronic content from a user and an input representing an action taken by a moderator with respect to the first electronic content. The moderator is a user that is privileged or otherwise tasked with monitoring the first electronic content and facilitating further disposition of the first electronic content via the action taken. The method 400 continues by extracting (404) one or more features from the first electronic content. The feature(s) can, in some cases, include a content-based feature, a user-based feature, a time-based feature, or any combination thereof. From the extracted feature(s) and the moderator action input, a predictive model can be generated (406) or updated. The predictive model may, for example, include a discriminatory model, an inter-action agreement model, or both. In some cases, the predictive model includes a machine learning discriminative model configured to model a dependence of the action on the extracted feature. In some such cases, the discriminative model includes a support vector machine classifier. In some cases, the input represents a plurality of actions taken by the moderator with respect to the first electronic content, and the machine learning discriminative model is further configured to model a dependence of at least one of the actions taken on at least one other of the actions taken.

In the prediction phase, the method 400 continues by receiving (408) second electronic content from the same user as the first electronic content or a different user. The method 400 continues by extracting (410) one or more features from the second electronic content. As described above, the features can include content-, user-, and time-based features, or any combination thereof. From the extracted feature(s) and using the predictive model, a suggested action or actions to be taken by the moderator with respect to the second electronic content can be determined (412). The suggested action(s) can then be presented (414) to the moderator (e.g., via a browser or other suitable user interface). In some cases, the suggested action can be assigned a confidence value based on the likelihood that the moderator will take the suggested action. In such cases, the suggested action may only be presented to the moderator when the confidence value is above a certain threshold (e.g., 50%).

Example Computing Device

Figure 5:
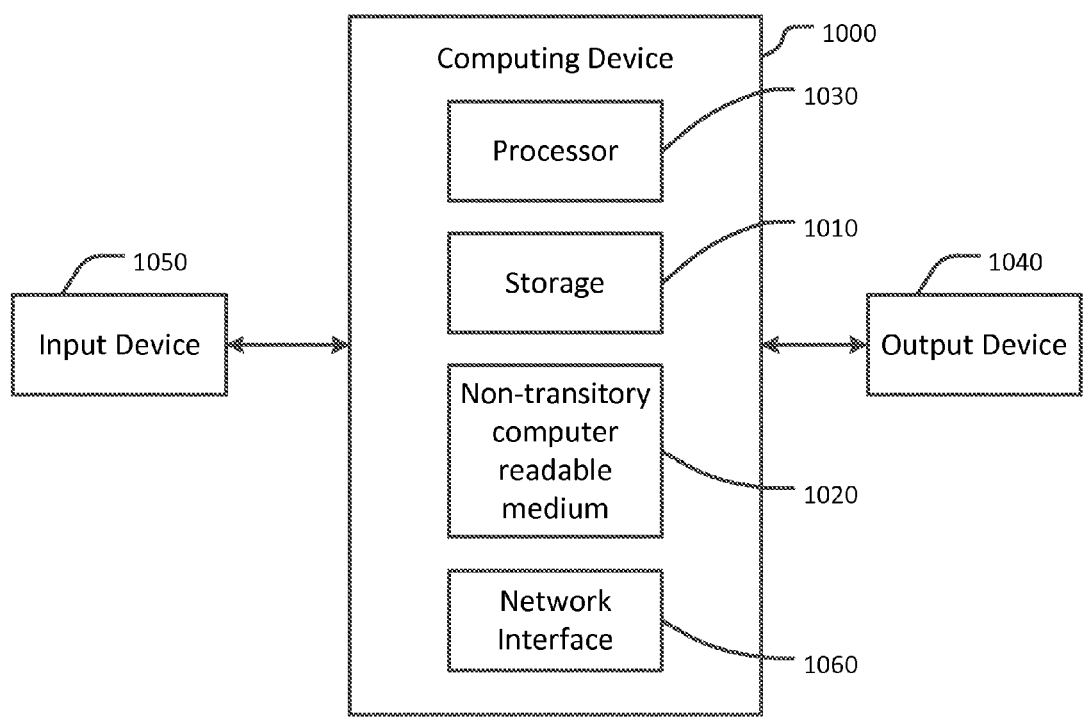
FIG. 5 is a block diagram representing an example computing device that may be used in accordance with an embodiment of the present invention.

FIG. 5 is a block diagram representing an example computing device 1000 that may be used to perform any of the techniques as variously described herein. For example, the user computing devices 102a, 102b, the moderator computing device 104, the server 106, or any combination of these (such as described with respect to FIG. 1) may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described herein. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught herein. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals. The computing device 1000 can include and/or be operatively coupled to various suitable devices for performing one or more of the functions as variously described herein. For instance, the computing device may include a network interface 1060 for communicating with other devices via a network, such as the Internet.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described herein. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

As will be appreciated in light of this disclosure, the various modules and components of the system shown in FIG. 1, such as the content generation module 110, the moderation module 112, the browser 114, the feature extraction module 116, the model generation module 118, the recommended action module 120, the discriminative model 122, and the inter-action agreement model 124, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided herein to be carried out. It will be appreciated that, in some embodiments, various functions performed by the user computing system, as described herein, can be performed by similar processors and/or databases in different configurations and arrangements, and that the depicted embodiments are not intended to be limiting. Various components of this example embodiment, including the user computing device 102a, 102b and the moderator computing device 104, can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides a system including a storage having at least one memory, and one or more processors each operatively coupled to the storage. The one or more processors are configured to carry out a process including receiving first electronic content from a user computing device and an input representing an action taken by a moderator with respect to the first electronic content, the moderator being a user tasked with monitoring the first electronic content and facilitating further disposition of the first electronic content via the action taken; extracting a feature from the first electronic content; and generating or updating a predictive model based on the feature and the input, the predictive model configured to model a dependence of the action on a presence of the feature. In some cases, the process includes receiving second electronic content from at least one of the user computing device and a different user computing device; extracting the feature from the second electronic content; determining, based on the predictive model and the feature, a suggested action to be taken by the moderator with respect to the second electronic content; and presenting the suggested action to the moderator. In some cases, the feature includes at least one of a content-based feature, a user-based feature and a time-based feature. In some cases, the predictive model includes a machine learning discriminative model configured to model the dependence of the action on the feature. In some such cases, the machine learning discriminative model includes a support vector machine classifier. In some cases, the input represents a plurality of actions taken by the moderator with respect to the first electronic content, and the machine learning discriminative model is further configured to model a dependence of at least one of the actions taken on at least one other of the actions taken. In some such cases, the process includes determining an additional suggested action to be taken by the moderator based on the suggested action and the predictive model. Another embodiment provides a non-transient computer-readable medium or computer program product having instructions encoded thereon that when executed by one or more processors cause the processor to perform one or more of the functions defined in the present disclosure, such as the methodologies variously described in this paragraph. As previously discussed, in some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
receiving first electronic content and second electronic content from a user computing device;
receiving a first input representing a first action taken with respect to the first electronic content;
receiving a second input representing a second action taken with respect to the second electronic content, the second action being different than the first action;
extracting a feature from each of the first electronic content and the second electronic content;
generating a first predictive model based on the feature and the first input, the first predictive model configured to model a dependence of the first action on a presence of the feature;
generating a second predictive model based on the feature and the second input, the second predictive model configured to model a dependence of the second action on the presence of the feature;
generating an inter-action agreement model representing a probability that the first action will be taken with respect to the feature extracted from the first and second electronic content, the inter-action agreement model further representing a probability that the second action will be taken with respect to the feature extracted from the first and second electronic content;
receiving third electronic content from the user computing device;
extracting the feature from the third electronic content;
determining, based on the first and second predictive models, the inter-action agreement model and the feature, a suggested action to be taken with respect to the third electronic content based on the relative probabilities of the first and second actions in the inter-action agreement model; and
presenting the suggested action via a user interface, the suggested action being selectable via the user interface, wherein the suggested action is taken in response to receiving a third input representing a selection of the suggested action.

2. The method of claim 1, wherein the feature includes at least one of a content-based feature, a user-based feature and a time-based feature.

3. The method of claim 1, wherein the predictive model includes a machine learning discriminative model configured to model the dependence of the action on the feature.

4. The method of claim 3, wherein the machine learning discriminative model includes a support vector machine classifier.

5. The method of claim 1, wherein the input represents a plurality of actions taken with respect to the first electronic content, and wherein the machine learning discriminative model is further configured to model a dependence of at least one of the actions taken on at least one other of the actions taken.

6. The method of claim 5, further comprising determining an additional suggested action to be taken based on the suggested action and the predictive model.

7. A system comprising:
a storage; and
a processor operatively coupled to the storage and configured to execute instruction stored in the storage that when executed cause the processor to carry out a process comprising:
receiving first electronic content and second electronic content from a user computing device, a first input representing a first action taken with respect to the first electronic content, and a second input representing a second action taken with respect to the second electronic content;
extracting a feature from each of the first electronic content and the second electronic content;
generating a first predictive model based on the feature and the first input, the first predictive model configured to model a dependence of the first action on a presence of the feature;
generating a second predictive model based on the feature and the second input, the second predictive model configured to model a dependence of the second action on the presence of the feature;
generating an inter-action agreement model representing a probability that the first action will be taken with respect to the feature extracted from the first and second electronic content, the inter-action agreement model further representing a probability that the second action will be taken with respect to the feature extracted from the first and second electronic content;
receiving third electronic content from the user computing device;
extracting the feature from the third electronic content;
determining, based on the first and second predictive models, the inter-action agreement model and the feature, a suggested action to be taken with respect to the third electronic content based on the relative probabilities of the first and second actions in the inter-action agreement model; and
presenting the suggested action via a user interface, the suggested action being selectable via the user interface, wherein the suggested action is taken in response to receiving a third input representing a selection of the suggested action.

8. The system of claim 7, wherein the feature includes at least one of a content-based feature, a user-based feature and a time-based feature.

9. The system of claim 7, wherein the predictive model includes a machine learning discriminative model configured to model the dependence of the action on the feature.

10. The system of claim 9, wherein the machine learning discriminative model includes a support vector machine classifier.

11. The system of claim 7, wherein the input represents a plurality of actions taken with respect to the first electronic content, and wherein the machine learning discriminative model is further configured to model a dependence of at least one of the actions taken on at least one other of the actions taken.

12. The system of claim 11, wherein the process further comprises determining an additional suggested action to be taken based on the suggested action and the predictive model.

13. A non-transitory computer readable medium having instructions encoded thereon that when executed by one or more processors cause a process to be carried out, the process comprising:

receiving first electronic content and second electronic content from a user computing device;

receiving a first input representing a first action taken with respect to the first electronic content;

receiving a second input representing a second action taken with respect to the second electronic content, the second action being different than the first action;

extracting a feature from each of the first electronic content and the second electronic content;

generating a first predictive model based on the feature and the first input, the first predictive model configured to model a dependence of the first action on a presence of the feature;

generating a second predictive model based on the feature and the second input, the second predictive model configured to model a dependence of the second action on the presence of the feature;

generating an inter-action agreement model representing a probability that the first action will be taken with respect to the feature extracted from the first and second electronic content, the inter-action agreement model further representing a probability that the second action will be taken with respect to the feature extracted from the first and second electronic content;

receiving third electronic content from the user computing device;

extracting the feature from the third electronic content;

determining, based on the first and second predictive models, the inter-action agreement model and the feature, a suggested action to be taken with respect to the third electronic content based on the relative probabilities of the first and second actions in the inter-action agreement model; and presenting the suggested action via a user interface, the suggested action being selectable via the user interface, wherein the suggested action is taken in response to receiving a third input representing a selection of the suggested action.

14. The non-transitory computer readable medium of claim 13, wherein the feature includes at least one of a content-based feature, a user-based feature and a time-based feature.

15. The non-transitory computer readable medium of claim 13, wherein the predictive model includes a machine learning discriminative model configured to model a dependence of the action on the feature.

16. The non-transitory computer readable medium of claim 15, wherein the machine learning discriminative model includes a support vector machine classifier.

17. The non-transitory computer readable medium of claim 13, wherein the input represents a plurality of actions taken with respect to the first electronic content, wherein the machine learning discriminative model is further configured to model a dependence of at least one of the actions taken on at least one other of the actions taken, and wherein the process further comprises determining an additional suggested action to be taken based on the suggested action and the predictive model.

* * * * *